United States Patent Office 3,105,387
Patented Oct. 1, 1963

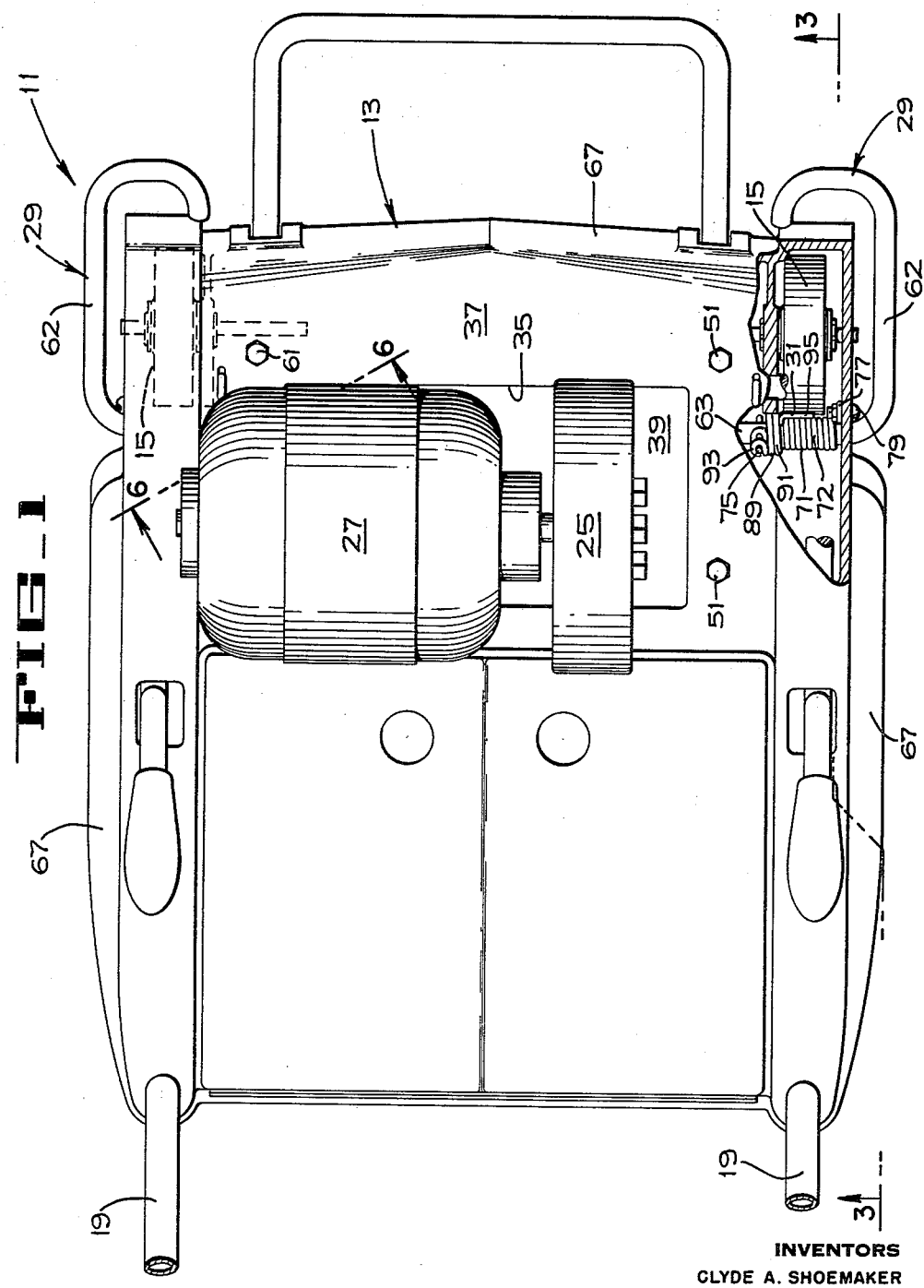
Oct. 1, 1963    C. A. SHOEMAKER ET AL    3,105,387
WHEEL SPINNER
Filed Aug. 29, 1960    4 Sheets-Sheet 1
INVENTORS
CLYDE A. SHOEMAKER
MELVIN H. LILL
BY Hans G. Hoffmeister
ATTORNEY

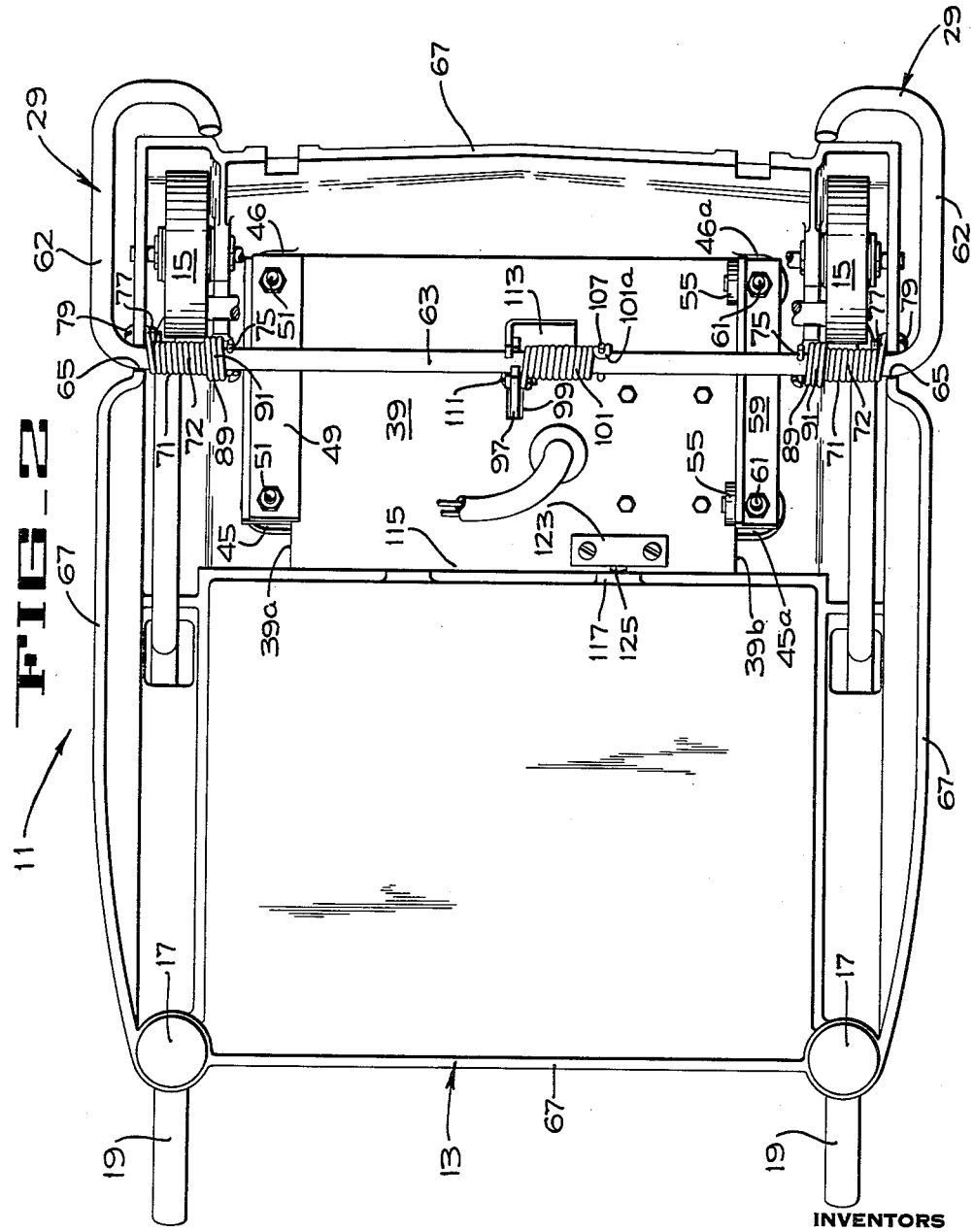

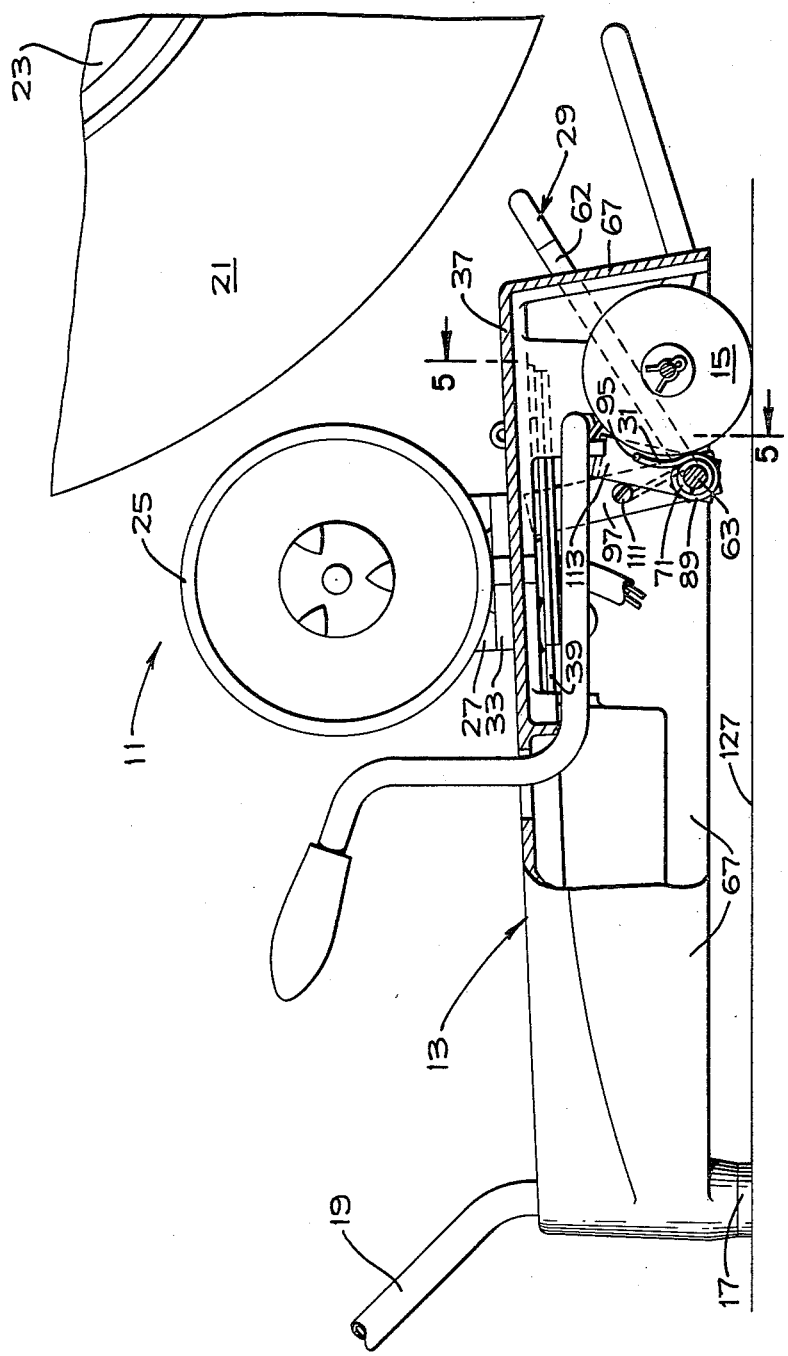

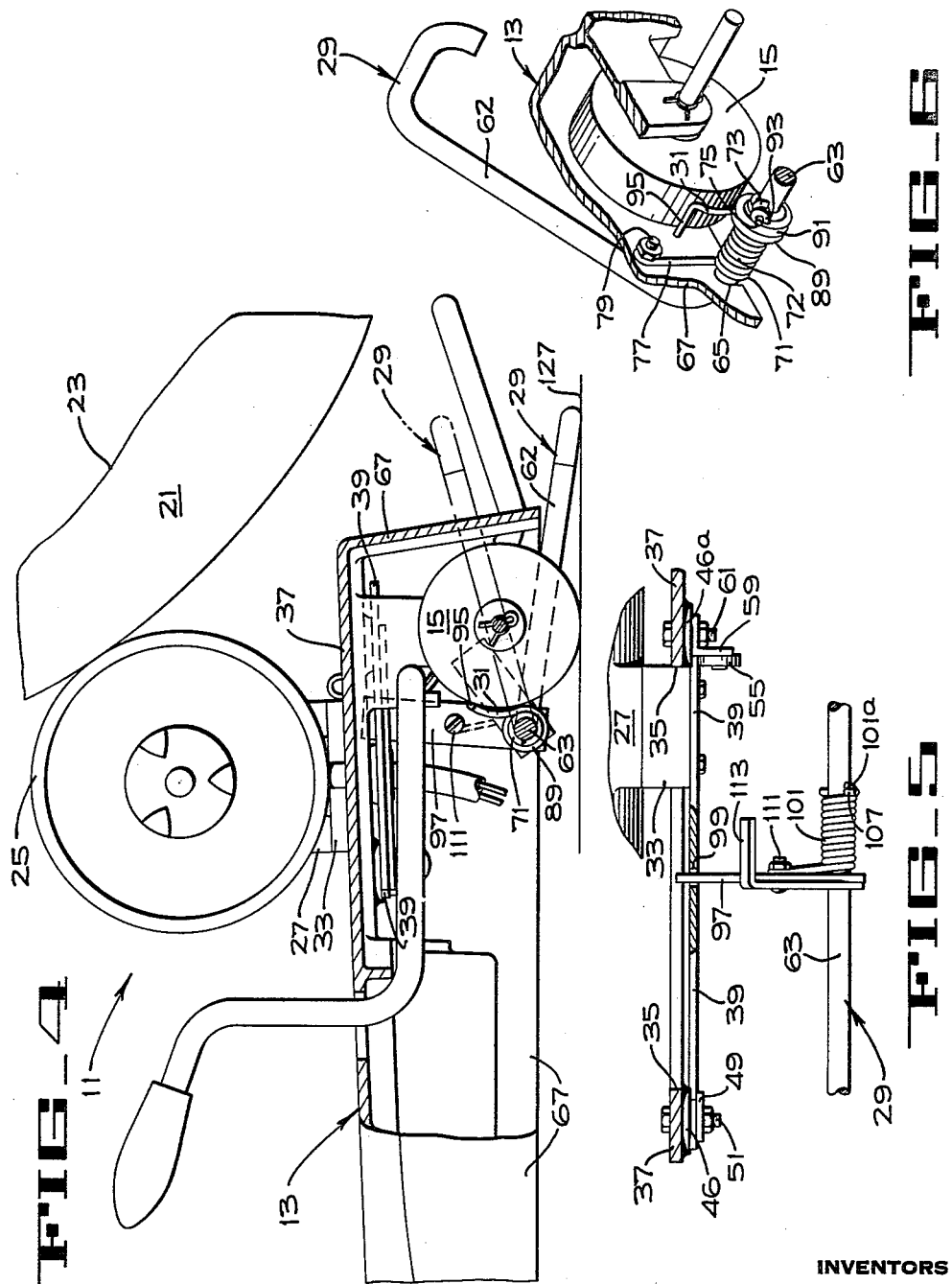

3,105,387
WHEEL SPINNER
Clyde A. Shoemaker, Pewamo, and Melvin H. Lill, East Lansing, Mich., assignors to FMC Corporation, a corporation of Delaware
Filed Aug. 29, 1960, Ser. No. 52,537
12 Claims. (Cl. 74—16)

The present invention appertains to automobile service equipment and more particularly relates to a portable wheel spinner used in on-the-car wheel balancing operations.

As one step in an on-the-car balancing operation of an automobile wheel, the wheel is first jacked up and is then driven, for instance, by use of a portable wheel spinner to rotate or spin the wheel to attain a relatively high speed at which its unbalance becomes most pronounced. When using known wheel spinners for this purpose, certain conditions, inherent to some extent in all automobile tires, contribute to the difficulty of maintaining constant, or nearly constant, driving engagement between the drive roller of the wheel spinner and the tread of the tire. In addition to unbalance, which is probably the most common of these conditions, the road engaging surface of the tire may be out of round, and there may be variations in the stiffness of the tire's casing. During the wheel spinning operation, any area of the tire in which any of these conditions exist will, upon striking the drive roller, impose a momentary force thereon during each revolution of the tire tending to propel the drive roller out of driving engagement with the tire. Such a force, cyclically applied to the drive roller, tends to repeatedly propel the drive roller out of driving engagement with the tire, and in so doing shakes or vibrates the wheel spinner and moves it out of operating position.

As rotation of the wheel is accelerated, both the frequency and the force with which the drive roller is struck by such an area of the tire is increased. Therefore, the drive roller makes only intermittent driving engagement with the tire of the automobile wheel and the entire wheel spinner is vibrated with such force that it is difficult to hold in operating position. For these reasons, the task of holding such a wheel spinner in position to maintain even poor engagement between the drive roller and the tire is laborious. In addition, the time required for the wheel to attain the desired speed is greater than would be necessary if the wheel spinner were not moved about and if engagement between the drive roller and the tire were more nearly constant.

Therefore, an object of the present invention is to provide an improved wheel spinner for use in on-the-car wheel balancing operations.

Another object is to provide improved means in a wheel spinner to maintain nearly constant engagement between the drive roller thereof and the tire of the wheel during wheel spinning operations.

Another object is to provide, in a portable wheel spinner, improved means for holding the spinner in fixed position on the floor during wheel spinning operations.

Another object is to provide, in a portable wheel spinner, improved means to concurrently maintain nearly constant engagement between the drive roller thereof and the tire of the wheel, and hold the wheel spinner housing in fixed position during wheel spinning operations.

These and other objects and advantages of the present invention will become apparent from the following description and the accompanying drawings, in which:

FIG. 1 is a top plan of a portable wheel spinner with certain parts broken away and embodying the present invention.

FIG. 2 is a bottom plan of the wheel spinner shown in FIG. 1, with certain parts broken away.

FIG. 3 is a side elevation, partly in section along lines 3—3 of FIG. 1, with certain parts broken away.

FIG. 4 is similar to FIG. 3, but showing the structure of the present invention in a different operating position.

FIG. 5 is a fragmentary vertical section, taken along lines 5—5 of FIG. 3 with certain parts broken away.

FIG. 6 is a perspective showing a fragment of the present wheel spinner as viewed in the direction indicated in general by the arrows 6—6 of FIG. 1.

The wheel spinner 11 of the present invention includes a body 13 (FIGS. 1–4) having a pair of transversly opposite transport wheels 15 suitably mounted for rotation adjacent the front end thereof, and transversely opposite support feet 17 adjacent its rear end. A substantially U-shaped handle 19 (only partly shown) is fixed to the rear portion of the body 13 for use by the operator in moving the spinner 11 on its transport wheels 15 from place to place. The wheel spinner 11 is thus capable of being moved into position adjacent the tire 21 of a mounted automobile wheel 23 (FIGS. 3 and 4) that is to be balanced. It will be understood that previous to the use of the spinner 11 to rotate the wheel 23, an on-the-car wheel balancer (not shown) of any well-known type, is connected to the wheel 23. It will be assumed for purposes of illustration, that the wheel 23 is a front wheel of a standard automobile and that the wheel has been jacked up to permit its free rotation.

When the wheel spinner 11 is in operative position, a drive roller 25 (FIGS. 1, 3 and 4) secured to the shaft of an electric motor 27 mounted for fore-and-aft movement on the body 13 is in planar alignment with the wheel 23. As will be explained in detail hereafter, after positioning the wheel spinner, the operator depresses an actuating lever 29 which moves the motor 27 forward with respect to the body 13 to start the motor and place the roller 25 in driving engagement with the tire 21 (FIG. 4) to rotate the wheel. Simultaneously with movement of the lever 29 to advance the drive roller 25 into engagement with the tire 21, opposite brake arms 31 connected to the lever 29 are moved from standby position (FIGS. 1, 3 and 6) into braking engagement with the transport wheels 15 (FIG. 4) to prevent their rotation and thus immobilize the wheel spinner 11 in operating position during the wheel spinning operation.

If one, or a combination of the conditions, previously enumerated, exist in any areas of the tire, these areas, upon striking the drive roller 25, will tend to propel the drive roller 25 rearwardly of the wheel spinner 11 out of engagement with the tire 21 thereby shaking or vibrating the wheel spinner 11. However, because of a resilient connection between the motor 27 and the lever 29, and the action of the brake arms 31, the apparatus of the present invention tends to absorb the vibrations, maintains nearly constant driving engagement between the drive roller 25 and the tire and immobilizes the wheel spinner in operative position.

Referring particularly to (FIGS. 3, 4 and 5), a base 33 of the motor 27 projects through a rectangular opening 35 (FIG. 1) in the deck 37 of the body 13 and is fixed to a generally horizontal mounting plate 39. The plate 39 is larger than the opening 35 and has one marginal edge 39a (FIG. 2) slidably engaged between a strap 49, that is secured to the deck 37 by bolts 51, and the faces of two bosses 45 and 46 formed on the underside of the deck 37. The opposite marginal edge 39b of plate 39 is disposed between two bosses 45a and 46a on the underside of the deck 37 and two rollers 55 that are rotatably mounted on an angle bar 59 secured by bolts 61 to the deck.

The actuating lever 29, which is of circular cross section, is of generally U-shaped configuration (FIG. 2) and includes opposite treadles 62 projecting at right angles from a bight portion 63 of the lever. The bight portion 63 of the lever 29 extends across the body 13 and is freely rotatable adjacent the treadles 62 in opposite, open-ended slots 65 (FIGS. 2 and 6) in the lower edge portion of a skirt 67 which encompasses and depends from the deck 37.

A torsion spring 71 (FIG. 2) is disposed at each end of the bight portion 63, each spring having a body 72 coiled about the bight portion 63 adjacent each of the treadles 62 and having one end 73 (FIG. 6) connected to the bight portion 63 by a pin 75 projecting therefrom. The other end portion 77 of each spring 71 projects laterally of the bight portion 63 from the body 72 and is attached by a bolt 79 to the adjacent portion of the skirt 67. Thus, the bodies 72 of the springs 71 retain the bight portion 63 in the slots 65 and serve as bearings to journal the lever 29 for pivotal movement in the body 13. The springs 71, reacting on the lever 29, provide sufficient force to urge the same in a counterclockwise direction (FIGS. 3, 4 and 6) into the raised position shown in FIGS. 3 and 6, for a purpose later to appear.

A second torsion spring 89 (FIG. 2) is disposed at each end of the bight portion 63 and each of these torsion springs (FIG. 6) has its body 91 coiled about the body 72 of the adjacent spring 71 and has one end 93 secured to the bight portion of the lever 29 by the pin 75. The other end portion of each spring 89 projects laterally of the bight portion 63 from the body 91 and comprises the previously mentioned brake arm 31. Each brake arm 31 includes an end portion 95 (FIG. 6) which projects substantially parallel to the bight portion 63. It is to be understood, that as shown best in FIGS. 3 and 6, the end portions 95 of the springs 89 are spaced from the transport wheels 15 when the treadles 62 are in raised position to dispose the motor 27 in its standby position, as shown in FIG. 3.

The downward movement of the lever 29 is transmitted to the motor mounting plate 39, to cause forward movement of the motor toward a wheel to be spun, by means of a torsion spring 101 (FIGS. 2 and 5) which is coiled around an intermediate portion of the bight 63. One end 101a of the spring is secured to the bight 63 by a pin 107 and the other end is secured by a bolt 111 to an arm 97 which is pivotally mounted at its lower end on the bight 63 and projects radially upward therefrom in close fitting relation through a slot 99 (FIG. 5) in the plate 39. When the lever 29 is pivoted downwardly, the torsion spring 101 is slightly stressed until it acts in the manner of a rigid link and imparts a pulling movement on the arm 97 to pivot it clockwise (FIG. 4), bringing the arm against the wall at the forward end of the slot 99 to move the motor mounting plate 39 forwardly. In this position, the torsion spring 101 resists any force tending to move the motor rearwardly while the treadle of lever 29 is held in depressed position.

When the wheel spinning operation has been completed and the operator withdraws his foot from the treadle 62, the mounting plate is slid rearwardly by the combined action of the uncoiling torsion spring 101 and the two torsion springs 71 which were also stressed during downward movement of the lever 29. The reaction of the three torsion springs is transmitted to the arm 97 by a rigid bar 113 which is welded to and projects radially from the bight 63. It is evident, of course, that the reaction of the torsion springs raises the lever 29 to its elevated position.

The electric power circuit (not shown) of the motor 27 includes a normally closed, pressure sensitive switch 123 (FIG. 2), secured to the undersurface of the plate 39 adjacent its rear edge 115. When the motor 27 is in its retracted or standby position (FIGS. 1 and 3), an actuator button 125 of the switch 123 is in engagement with the stop 117 and pressed inwardly of the switch to thereby open the switch 123 and the power circuit of the motor 27 to stop operation thereof.

Let it be assumed that the wheel spinner 11 of the present invention is supported on its transport wheels 15 and feet 17 in operating position on a floor or support surface 127 (FIGS. 3 and 4) adjacent the automobile wheel 23 preparatory to performance of an on-the-car wheel balancing operation. When the operator first slightly depresses either one of the treadles 62 to initiate a wheel spinning operation, forward movement of the plate 39 by the lever 29 carries the motor 27 and roller 25 as well as the switch 123 forward. The button 125 is, therefore, released to thereby close the switch 123 thus energizing the motor circuit to start operation of the motor 27 and rotation of the drive roller 25. Continued downward movement of either of the treadles 62, against the resistance of the springs 71 and 101, ultimately disposes the treadles 62 in the position shown in full lines in FIG. 4 in contact with the support surface 127. During this latter movement of the lever 29, the first action to take place is the movement of the brake arms 31 to bring the projecting portions 95 thereof into engagement with the transport wheels 15 which are thus held against rotation by the resilient force of the springs 89. Simultaneously with or shortly after the application of the braking force to the transport wheels 15, the drive roller 25 is moved forward into operative position or driving engagement with the tire 21 before the treadles 62 contact the support surface 127. It will be understood that forward movement of the motor 27 and its mounting plate 39 is stopped by engagement of the roller 25 with the tire 21 when the treadles 62 are in the phantom position (FIG. 4) and before the treadles 62 contact the support surface 127. As a consequence, further clockwise movement of the arm 97 with the lever 29 (FIG. 4) is discontinued. Thereafter, downward movement of the treadles 62 before reaching the support surface 127, carries the abutment member 113 in a clockwise direction (FIG. 4) out of engagement with the arm 97 and increases the force applied thereto by the spring 101. As a result, after the treadle has been moved down into contact with the floor 127, the arm 97 is free to pivot a limited distance in either a clockwise or a counterclockwise direction about the bight portion 63 of the lever 29 while being urged by the spring 101 in a clockwise direction without affecting the position of the treadles 62. With this arrangement, the spring 101 urges the arm 97 and the mounting plate 39 forward to retain the drive roller 25 in firm but resilient driving engagement with the tire 21 and acts as a shock absorber between the motor 27 and the body 13. Therefore, when the tire is out of round, or unbalanced, or its casing varies in stiffness, the areas of the tire in which such conditions occur will not be effective, upon striking the drive roller, to propel the drive roller 25 out of driving engagement with the tire 21 of the rapidly rotating wheel 23. For this reason, the wheel spinner 11 is not vibrated and nearly constant driving engagement is maintained between the roller 25 and the tire 21 under the conditions mentioned while the treadles 62 are fully depressed as shown in FIG. 4. It will be apparent that throughout the time the drive roller 25 is held in resilient engagement with the tire 21 of a rotating wheel, the brake arms 31 apply an uninterrupted braking force to the transport wheels 15 to prevent their rotation. In this way, the wheel spinner 11 of the present invention is retained in operating position during on-the-car wheel balancing operations.

Upon release of the treadles 62, the bight portion 63 of the lever 29 is rotated in a counterclockwise direction (FIG. 4) by the springs 71 and 101 and the treadles 62 are raised from the full line position shown in FIG. 4 to the position shown in FIG. 3. Such movement of the lever 29 carries the abutment stop 113 into engagement with the arm 97 which has not yet moved the motor 27 and drive roller 25 rearward. Thereafter, the springs 71 and 101 acting through the arm 97 move the mounting plate 39 and the motor 27 rearward to first move the drive roller 25 out of engagement with the tire 21 and then move the end portions 96 of the brake arms 31 out of engagement with the transport wheels 15. The rear edge 115 of the plate 39 and the switch button 125 are next brought into engagement with the stop 117. In this way, the motor 27 is moved to standby position and the switch 123 is opened to de-energize the motor.

It will be apparent from the foregoing description that the wheel spinner 11 is not vibrated during the wheel spinning operation and as a consequence the operator's task of using the wheel spinner 11 of the present invention is more simple than that of using known wheel spinners. At the same time, nearly constant driving engagement is maintained between the drive roller 25 of the wheel spinner 11 and the tire 21. In addition, the action of the brake arms 31 in preventing rotation of the transport wheels 15 throughout the time the wheel 23 is driven, assures that the wheel spinner 11 will remain in operating position during wheel spinning operations.

While a particular embodiment of the invention has been shown and described, it will be understood that the apparatus thereof is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. A portable wheel spinner disposable in operating position adjacent a rotatably mounted wheel for use in spinning the wheel comprising a body, power driven wheel drive means mounted for movement relative to said body, actuating means connected to said body, resilient means operatively connected between said wheel drive means and said actuating means operative upon movement of said actuating means for advancing said wheel drive means into driving engagement with said wheel and for maintaining resilient driving engagement between said wheel drive means and the wheel, and means operatively connected to and movable with said actuating means for immobilizing the wheel spinner in operating position when said wheel drive means is advanced into driving engagement upon said movement of said actuating means.

2. In a wheel spinner adapted to be positioned adjacent a rotatably mounted wheel for use in spinning the wheel, a body, wheel drive means mounted for movement relative to said body into driving engagement with said wheel to spin the same, a lever pivotable on said body, a pivotable arm pivotally mounted upon said lever, said arm being operatively connected to said wheel drive means, and spring means interconnecting said arm and said lever operative upon movement of said lever for advancing said wheel drive means into driving engagement with the wheel and for maintaining resilient driving engagement between said wheel drive means and the wheel.

3. In a wheel spinner to be located in operating position adjacent a rotatably mounted wheel for use in spinning the wheel, a body, wheel drive means mounted for movement relative to said body into driving engagement with the wheel to spin the same, a lever pivotable on said body, a pivotable arm operatively connected to said wheel drive means, resilient means interconnecting said lever and said arm and arranged upon movement of said lever to advance said wheel drive means into driving engagement with the wheel and maintain resilient driving engagement between said wheel drive means and the wheel, and means operatively connected to and movable with said lever and operable to immobilize the wheel spinner in operating position upon said movement of said lever.

4. In a wheel spinner for use in spinning a rotatably mounted wheel, a body, a transport wheel mounted on said body for rotation and arranged to support the wheel spinner for movement from place to place on a surface and into operating position adjacent the mounted automobile wheel, drive means mounted for movement on said body into driving engagement with the mounted wheel to spin the same, a lever pivotable on said body, resilient means operatively connected between said wheel drive means and said lever and arranged upon movement of said lever to advance said wheel drive means into driving engagement with the mounted wheel to maintain resilient driving engagement between said wheel drive means and the mounted wheel, and means connected to said lever and movable into engagement with said transport wheel upon said movement of said lever to thereby immobilize said transport wheel and retain the wheel spinner in operating position on the surface when said wheel drive means is advanced into driving engagement.

5. A portable wheel spinner disposable in operating position adjacent a freely rotatable wheel comprising a body, drive means mounted for movement on said body between a retracted position and a projected position drivingly engaging the wheel, a lever pivotable on said body for movement between a standby position and an operative position, a pivotable arm pivotally mounted on said lever and operatively connected to said wheel drive means, resilient spring means interconnecting said arm and said lever operative upon movement of said lever from the standby position to the operative position for advancing said wheel drive means from retracted position into projected position and for maintaining resilient driving engagement between said wheel drive means and the freely rotatable wheel, an abutment member fixedly carried by said lever and pivotable therewith, said abutment member being engageable with said arm, and means operative upon release of said lever for returning the lever from operative position to standby position whereby said abutment member engages and moves said arm to return said wheel drive means from its projected position to its retracted position.

6. A portable wheel spinner disposable in operating position adjacent a rotatably mounted wheel comprising a body, a transport wheel mounted on said body for rotation and arranged to support the wheel spinner for movement from place to place on a surface and into operating position adjacent the wheel, wheel drive means mounted for movement on said body between a retracted position and a projected position drivingly engaging the rotatably mounted wheel to spin the same, a lever pivotable on said body for movement between a standby position and an operative position, a pivotable arm operatively connected to said wheel drive means, resilient means interconnecting said arm and said lever for moving said wheel drive means from retracted position to projected position and for maintaining resilient driving engagement between said wheel drive means and the rotatably mounted wheel upon movement of said lever from its standby position to its operative position, means connected to said lever and movable into engagement with said transport wheel upon said movement of said lever from its standby position to its operative position to thereby immobilize the wheel spinner in operating position, an abutment member carried by said lever and engageable with said arm, and means operative upon release of said lever for returning the lever from its operative position to its standby position whereby said abutment member engages and moves said arm to return said wheel drive means to its retracted position from its projected position and said immobilizing means is moved out of engagement with said transport wheel.

7. A portable wheel spinner comprising a body, power driven wheel drive means mounted on said body for movement relatively thereto from a standby position to an operative position, actuating means for said wheel drive means, spring means mounting said actuating means for movement on said body between a standby position and an operative position and urging said actuating means toward its standby position, an arm pivotable on said actuating means and operatively connected to said wheel drive means, and spring means connected between said arm and said actuating means and operable to urge said arm in a direction to move said wheel drive means toward operative position when said actuating means is moved from its standby position to its operative position.

8. A portable wheel spinner comprising a body, power driven wheel drive means mounted on said body for movement relatively thereto from a standby position to an operative position, actuating means for said wheel drive means, spring means mounting said actuating means for movement on said body between a standby position and an operative position and urging said actuating means toward its standby position, an abutment member fixed to said actuating means for movement therewith, an arm pivotable on said actuating means and operatively connected to said wheel drive means, and resilient means connected between said arm and said actuating means and operable to urge said arm in a direction to move said wheel drive means to operative position when said actuating means is moved from its standby position to its operative position, said abutment member being arranged to retract said arm and said wheel drive means from operative position to standby position upon return movement of said actuating means to its standby position.

9. A portable wheel spinner movable on a support surface into operating position adjacent the peripheral surface of a rotatably mounted wheel comprising a body, roller drive means mounted on said body and movable into driving engagement with the peripheral surface to spin the wheel, a transport wheel mounted on said body for rotation and arranged to support the wheel spinner for movement from place to place on a surface and into operating position thereon, wheel engaging means movable into braking engagement with said transport wheel to hold the same against rotation and thereby immobilize the wheel spinner in operating position, and actuating means connected to said wheel engaging means for moving said wheel engaging means into braking relation with said transport wheel.

10. A portable wheel spinner movable on a support surface adjacent the peripheral surface of a rotatably mounted wheel comprising a body, a drive roller movably mounted on said body and movable into engagement with the peripheral surface of said mounted wheel, a transport wheel mounted on said body for rotating and arranged to support the wheel spinner for movement from place to place on a surface and into operating position thereof, means arranged upon movement thereof to immobilize said transport wheel on said support surface, and means operatively connected to said immobilizing means and to said drive roller for simultaneously immobilizing the wheel spinner and moving said drive roller into engagement with said mounted wheel.

11. A portable wheel spinner movable into operating position on a support surface adjacent the peripheral surface of a rotatably mounted wheel comprising a body, roller drive means movable into driving engagement with the peripheral surface of said mounted wheel, a motor for driving said roller drive means, mounting means for said drive means and said motor movably mounted upon said body for moving said drive means into engagement with said mounted wheel, a switch on said mounting means for controlling said motor, said switch being closed when said drive means is moved into engagement with said mounted wheel, a transport wheel mounted on said body for rotation and arranged to support the wheel spinner for movement from place to place on a surface and into operating position thereon, immobilizing means movable into engagement with said transport wheel to immobilize the wheel spinner in operating position, and actuating means connected to said immobilizing means and to said mounting means for simultaneously immobilizing the wheel spinner in operative position with relation to said mounted wheel and moving said drive means into engagement with said mounted wheel.

12. A portable wheel spinner movable into operating position adjacent a rotatably mounted wheel comprising a body, a support member slidably received by said body, a drive roller and a driving motor for driving said roller mounted upon said support member, a normally closed switch carried by said support member for operating said motor, stop means on said body for engagement with said switch to open said switch and de-energize said motor, a pivotable arm movable relative to said body in engagement with said support member for sliding said support member along said body between two positions including an operative position whereby said roller will engage said mounted wheel and a stand-by position whereby said switch is in engagement with said stop means, and resilient means for resiliently holding said support member in said operative position.

References Cited in the file of this patent

UNITED STATES PATENTS

| | | |
|---|---|---|
| 2,565,233 | Hunter | Apr. 21, 1951 |
| 2,728,236 | Hemmeter | Dec. 27, 1955 |
| 2,731,841 | Merrill et al. | Jan. 24, 1956 |
| 3,030,815 | Lill et al. | Apr. 24, 1962 |